No. 698,359. Patented Apr. 22, 1902.
J. W. BERRY.
SPLIT PULLEY HANGER.
(Application filed Aug. 31, 1901.)

(No Model.)

WITNESSES
INVENTOR

UNITED STATES PATENT OFFICE.

JOHN W. BERRY, OF TACOMA, WASHINGTON, ASSIGNOR TO TACOMA AUTOMATIC SCALES CO., OF TACOMA, WASHINGTON.

SPLIT-PULLEY HANGER.

SPECIFICATION forming part of Letters Patent No. 698,359, dated April 22, 1902.

Application filed August 31, 1901. Serial No. 73,999. (No model.)

*To all whom it may concern:*

Be it known that I, JOHN W. BERRY, a citizen of the United States, residing at 613 North Oakes street, in the city of Tacoma, in the county of Pierce and State of Washington, have invented certain new and useful Improvements in Split-Pulley Hangers, of which the following is a specification.

My invention comprises a pair of hooks or bent pieces of metal or other suitable material each pivotally attached to the opposite sides of one half of a split pulley.

The object of my invention is to provide a means whereby one half of a split pulley can be attached to or hung on a shaft while the other half is being fitted and fastened thereto, thus enabling the work to be done by one man instead of two men, as is usually required. I attain this object by means of the device illustrated in the accompanying drawings, in which—

Figure 1:
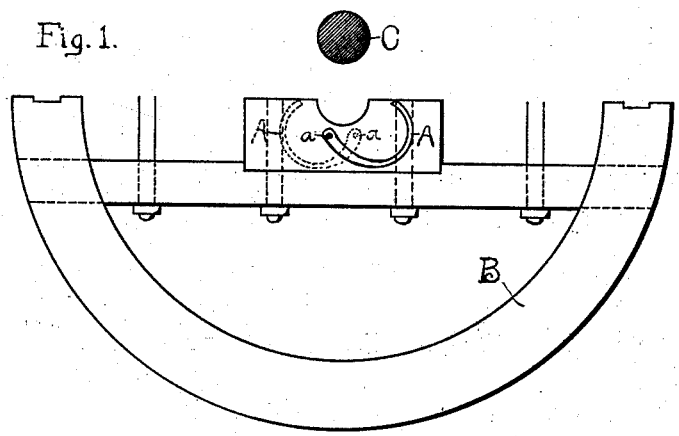
Figure 2:
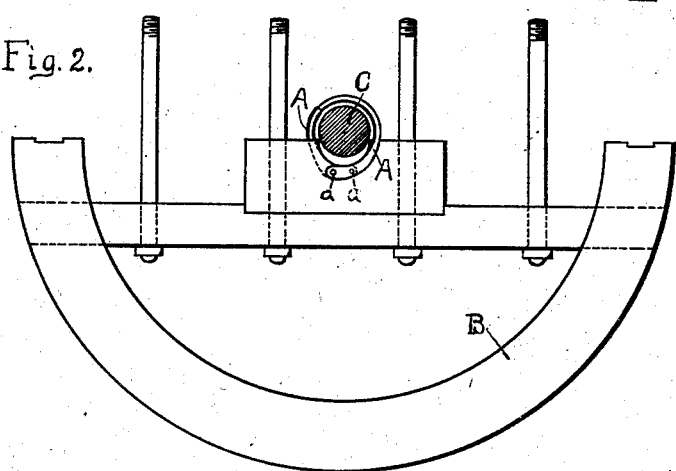

Figure 1 represents my invention on one half of a split pulley ready to be applied to a shaft. Fig. 2 represents the one half suspended in position and the other half in readiness to be fastened thereto.

Similar letters refer to similar parts in the several views.

My invention comprises two curved or angle-shaped hooks or arms A A, one pivotally attached at *a a* on each side of one half of the split pulley B. These hooks are swung open, so as to clear the shaft C when the pulley is to be placed thereon. (See Fig. 1.) The one half of the pulley is placed against the under side of the shaft C and the hooks A A are swung up and over the shaft, as seen in Fig. 2. They will now so engage the shaft C as to suspend the half of the pulley thereon, while the workman bolts the other half of the pulley thereto and in place. The hooks being fastened close to the sides of the pulley do not in any way interfere with the working of the pulley after it is on the shaft. They are left in place and are equally as useful in removing the pulley from the shaft.

My invention is designed to be attached to and used on any form and size of split pulleys. I do not limit myself to any form of hook, but reserve the right to use any shape of hook or swinging arm that will engage the shaft and support the half of a pulley on the shaft.

Having thus described my invention, what I claim as new, and desire to secure by Letters Patent, is—

1. The combination with a split pulley of a swinging arm or hook pivotally attached to one side of one half of a split pulley, said arm or hook so formed as to swing over and engage the pulley-shaft and support the half of the split pulley thereon.

2. The combination with a split pulley of a pair of arms or hooks pivotally attached, one on each side of one part of said pulley, said arms so formed as to swing over and engage the pulley-shaft and support the one part of the split pulley thereon while the other part is being bolted thereto and in place.

In testimony whereof I affix my signature in the presence of two witnesses.

JOHN W. BERRY.

Witnesses:
G. W. BULLARD,
E. A. SPAULDING.